(12) United States Patent
Moses et al.

(10) Patent No.: US 6,579,026 B2
(45) Date of Patent: Jun. 17, 2003

(54) DUAL DRAW KEY ARRANGEMENT FOR STEER AXLE KINGPIN

(75) Inventors: David G. Moses, Decauter, IN (US); Dick D. Ryan, Kalamazoo, MI (US); Mark A. Davis, Portage, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/845,913

(22) Filed: Apr. 30, 2001

(65) Prior Publication Data
US 2002/0159826 A1 Oct. 31, 2002

(51) Int. Cl.[7] .................................................. F16C 11/06
(52) U.S. Cl. .............. 403/158; 280/93.512; 280/93.511
(58) Field of Search ...................... 280/93.511, 93.512, 280/96.1, 86.75, 86.751, 86.754, 86.756, 86.758, FOR 110, FOR 124; 403/158, 335, 338, 344, 373, 374.1, 374.3, 374.4, 374.5; 301/124.1, 111.01, 111.03, 111.04, 111.07

(56) References Cited
U.S. PATENT DOCUMENTS

| | | | | |
|---|---|---|---|---|
| 1,865,202 A | * | 6/1932 | Milligan | 280/93.512 |
| 3,342,507 A | * | 9/1967 | Koch et al. | 280/86.754 |
| 3,388,923 A | * | 6/1968 | Maynard | 280/93.512 |
| 4,229,017 A | * | 10/1980 | Hagedorn | 280/96.1 |
| 4,243,339 A | * | 1/1981 | Dickerson | 403/4 |
| 4,569,290 A | | 2/1986 | Hecht et al. | |
| 4,653,773 A | * | 3/1987 | Graft | 280/673 |
| 5,350,183 A | * | 9/1994 | Shealy | 280/96.1 |
| 5,408,900 A | * | 4/1995 | Marui | 74/551.4 |
| 5,709,399 A | * | 1/1998 | Smith, Jr. | 280/96.1 |
| 5,722,784 A | * | 3/1998 | Link | 403/158 |
| 6,071,032 A | | 6/2000 | Link | 403/158 |

* cited by examiner

Primary Examiner—Lynne K. Browne
Assistant Examiner—Michael P. Ferguson
(74) Attorney, Agent, or Firm—Dykema Gossett PLLC

(57) ABSTRACT

A steer axle assembly is provided. The assembly includes an axle beam that defines a boss at one end. The boss defines one bore configured to receive a kingpin. The boss further defines two additional bores that intersect the kingpin bore and that are configured to receive draw keys used to secure the kingpin within the kingpin bore. The draw keys are both disposed on an inboard side of the kingpin. The assembly further includes nuts disposed about one end of the draw keys on the same side of the axle beam. The inboard location of the draw keys and the same-side location of the nuts reduces assembly time for the steer axle assembly and securely locks the kingpin within the bore.

17 Claims, 1 Drawing Sheet

DUAL DRAW KEY ARRANGEMENT FOR STEER AXLE KINGPIN

BACKGROUND OF THE INVENTION

1. Field of the Invention

This invention relates to steer axle assemblies and, in particular, to draw keys for use in maintaining the position of a steer axle kingpin.

2. Disclosure of Related Art

Conventional steer axle assemblies include an axle beam that defines a boss at either end. Each boss defines a kingpin bore configured to receive a kingpin on which a steering knuckle may be rotatably supported. Each boss further defines at least one additional bore that intersects the kingpin bore. This additional bore is configured to receive a draw key that engages the kingpin and limits movement of the kingpin within the kingpin bore.

In one conventional steer axle assembly, the boss of the axle beam defines two draw key bores that intersect the kingpin bore. One of the draw key bores is disposed on an inboard side of the kingpin bore while the other draw key bore is disposed on an outboard side of the kingpin bore. This conventional steer axle assembly has several disadvantages. First, the beam requires a relatively large amount of material and machining. Second, the kingpin does not have sufficient contact or sufficiently low contact pressures within the kingpin bore to retain the initial assembly fit throughout service life in certain application and design packages. Third, the centerline of the kingpin is angled relative to the centerline of the kingpin bore thereby resulting in additional variation in axle camber. Fourth, the steering knuckle has difficulty clearing the axle boss and outboard draw key and nut during turns. Finally, the axle assembly is difficult to assemble.

There is thus a need for a steer axle assembly that will minimize or eliminate one or more of the above-mentioned deficiencies.

SUMMARY OF THE INVENTION

The present invention provides a steer axle assembly having an improved draw key arrangement.

A steer axle assembly in accordance with the present invention includes an axle beam that defines a boss at one end. The boss further defines first, second, and third bores. The first bore is disposed about a first axis and the second and third bores both intersect the first bore on an inboard side of the first axis. The assembly further includes a kingpin disposed within the first bore and first and second draw keys disposed within the second and third bores and in engagement with the kingpin. Finally, the inventive assembly includes first and second nuts disposed about the first and second draw keys on one side of the axle beam.

A steer axle assembly in accordance with the present invention has several advantages as compared to conventional steer axle assemblies. The axle beam of the inventive assembly requires less material and may be machined more easily because the draw keys are located on the same side of the kingpin bore. The inboard location of the draw keys also increases the contact area of the kingpin within the kingpin bore and reduces clearance problems during turning of the steering knuckle. Further, the inboard location of the draw keys enables the centerline of the kingpin to align parallel to the centerline of the kingpin bore thereby eliminating one factor influencing axle camber. Finally, the inboard location of the draw keys and the location of the nuts on the same side of the axle beam reduces assembly time as compared to conventional steer axle assemblies.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
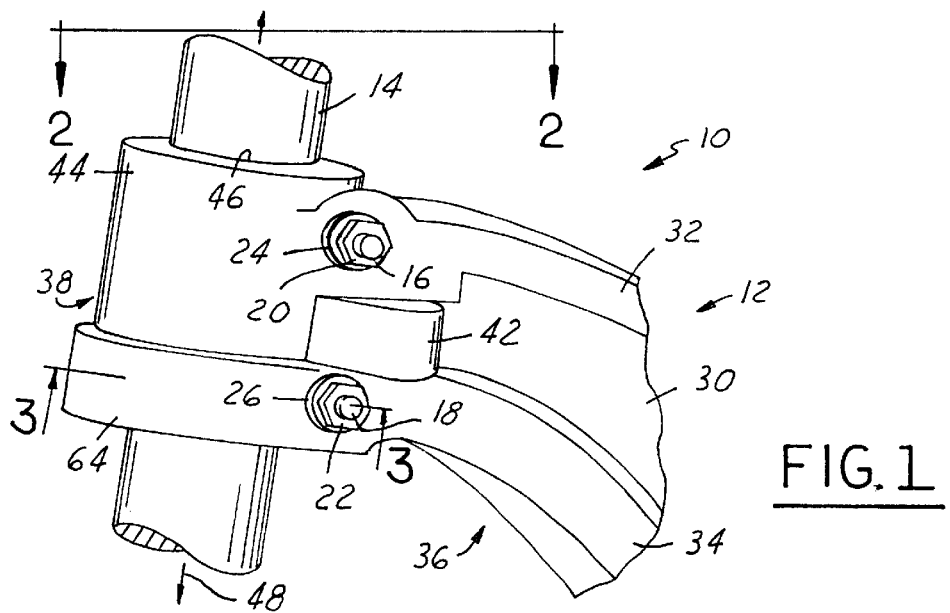
FIG. 1 is a perspective view of a steer axle assembly in accordance with the present invention.
Figure 2:
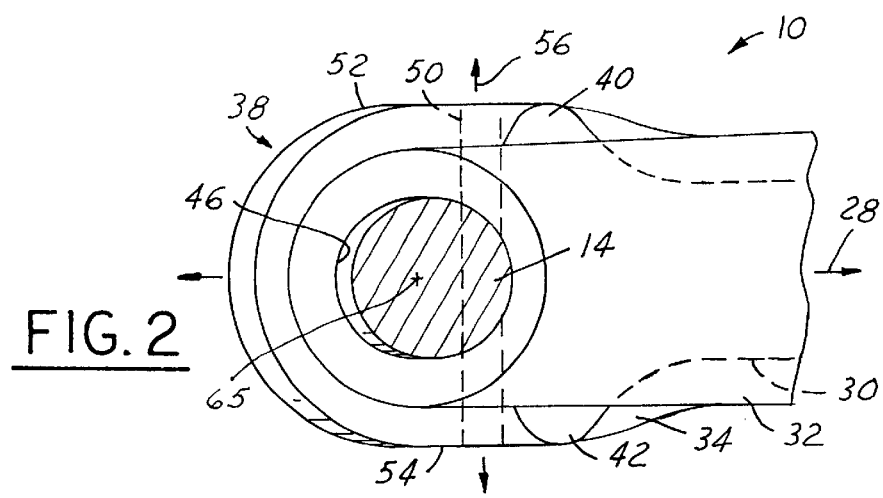
FIG. 2 is a top plan view of the steer axle assembly of FIG. 1.

Referring now to the drawings wherein like reference numerals are used to identify identical components in the various views, FIGS. 1 and 2 illustrate a steer axle assembly 10 in accordance with the present invention. Assembly 10 is configured for use in large trucks. It should be understood, however, that assembly 10 may find use in a variety of vehicles. Assembly 10 may include an axle beam 12, a kingpin 14, draw keys 16, 18, nuts 20, 22, and washers 24, 26. Although only one end of beam 12 is illustrated in the drawings, it will be understood that assembly 10 includes a similar construction at the other end of axle beam 12.

Axle beam 12 is provided to support a vehicle (not shown) on wheels (not shown) disposed proximate either end of beam 12. Beam 12 may be from steel and may be forged. It should be understood, however, that material composition and method of manufacture of beam 12 may be varied without departing from the spirit of the present invention. Beam 12 may be disposed about an axis 28 (FIG. 2) and have a conventional I-shape in cross-section with a generally vertically extending body 30 and generally horizontally extending upper and lower legs 32, 34. Beam 12 may be formed with a gooseneck 36 proximate each end to establish the drop of axle beam 12.

Figure 3:
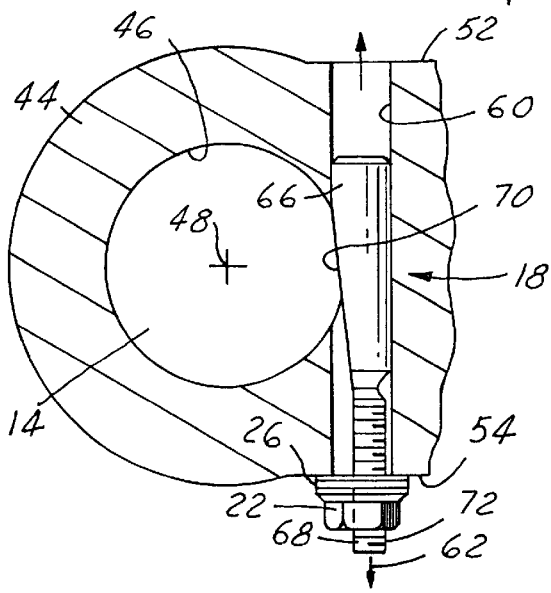
FIG. 3 is a cross-sectional view of the steer axle assembly of FIG. 1 taken along lines 3—3.

Beam 12 defines a boss 38 at each end. In particular, the width of body 30 initially expands in axial cross-section proximate the end of beam 12 to define a pair of curved flanges 40, 42 extending from either side of beam 12 and then contracts before expanding again (resulting in an S-shaped curve when beam 12 is viewed from top or bottom as shown in FIG. 2). Body 30 then defines part of a cylindrical housing 44 having a bore 46 configured to receive kingpin 14. Bore 46 is disposed about an axis 48. Body 30 and upper leg 32 together define another bore 50 configured to receive draw key 16. Referring to FIG. 2, bore 50 extends from one side 52 of beam 12 to an opposite side 54 of beam 12 and intersects bore 46. Bore 50 is disposed about an axis 56 that extends parallel to a plane containing axis 48. Lower leg 34 defines another bore 60 configured to receive draw key 18. Referring to FIG. 3, bore 60 also extends from side 52 of beam 12 to side 54 of beam 12 and intersects bore 46. Bore 60 is also disposed about an axis 62 that extends parallel to a plane containing axis 48. In accordance with the present invention, bores 50, 60 are both disposed on an inboard side of axis 48 of bore 46. Lower leg 34 further defines a peripheral flange 64 extending radially outwardly from housing 44. As a result, although bore 48 of housing 44 has a generally uniform inner diameter over its axial length, the outer diameter of housing 44 varies, having a greater outer diameter at one axial end.

Kingpin 14 is provided to rotatably couple a steering knuckle (not shown) to beam 12. Kingpin 14 is conventional in the art and may be made from steel or other conventional metals or metal alloys. Kingpin 14 is disposed within bore 46. In accordance with the present invention kingpin 14 is centered about an axis 65 that extends parallel to axis 48. As a result, the diametrical tolerances of kingpin 14 and bore 46 do not influence the camber of axle beam 12 and camber adjustment (for improvements in tire life and vehicle handling) is easier than in conventional steer axle assemblies.

Draw keys 16, 18 are provided to limit movement of kingpin 14 within bore 46. Draw keys 16, 18 may be made from conventional metals and metal alloys such as steel. Draw keys 16, 18 are configured to be received within bores 50, 60. Referring to FIG. 3, each draw key 16, 18 includes first and second portions 66, 68. Although only one of draw keys 16, 18 is shown in FIG. 3, it should be understood that the other draw key may be substantially similar in construction and orientation.

Portion 66 is configured to engage kingpin 14. Portion 66 is generally circular in cross-section, but defines a flat 70 that abuts kingpin 14 upon installation of draw key 18 within bore 60. Portion 66 (or at least flat 70), may be induction hardened in a conventional manner to increase the life of draw key 18 and retain its intended function in conjunction with washers 24, 26 under relatively high application loads.

Portion 68 is generally circular in cross-section and includes a plurality of threads 72. The diameter of portion 68, as defined by threads 70, is less than the diameter of bore 60 and the diameter of portion 66.

Nuts 20, 22 are provided to secure draw keys 16, 18 within bores 50, 60 to ensure draw keys 16, 18 remain in contact with kingpin 14. Nuts 20, 22 are conventional in the art. Each of nuts 20, 22 includes a plurality of threads configured to mate with threads 70 on portions 68 of draw keys 16, 18. In accordance with the present invention, nuts 20, 22 are both disposed on one side 54 of axle beam 12 upon assembly. In the illustrated embodiment, nuts 20, 22 are disposed on the rear side 54 of beam 12. It should be understood, however, that nuts 20, 22 may alternatively be disposed on the front side 52 of beam 12.

Washers 24, 26 are provided to further secure draw keys 16, 18 within bores 50, 60. Washers 24, 26 are conventional in the art and may comprise spring washers. Washers 24, 26 are disposed about portions 68 of draw keys 16, 18 between beam 12 and nuts 20, 22.

Referring again to FIGS. 1–3, a method of assembling steer axle assembly 10 in accordance with the present invention will be described. The method may include the step of providing beam 12, kingpin 14, draw keys 16, 18, nuts 20, 22, and washers 24, 26. The method may further include the steps of inserting kingpin 14 into bore 46 of beam 12 and installing draw keys 16, 18 in bores 50, 52 of beam 12.

The step of installing draw keys 16, 18 in bores 50, 60 may include several substeps. In particular, installing each of draw keys 16, 18 may include the substep of positioning draw keys 16, 18 such that portions 68 of draw keys 16, 18 are oriented to enter bores 50, 60 before portions 66 of draw keys 16, 18. The installing step may further include the substeps of inserting draw keys 16, 18 into bores 50, 60 from side 52 of beam 12 and seating draw keys 16, 18 within bores 50, 50 by applying a force to portions 66 of draw keys 16, 18 (e.g., with a hammer). Seating draw keys 16, 18 within bores 50, 60 also causes portions 68 to project out of bores 50, 60 on side 54 of axle beam 12.

The method of assembling steer axle assembly 10 may finally include the steps of installing washers 24, 26 and nuts 20, 22 over the now-projecting portions 68 of draw keys 16, 18 on side 54 of beam 12. In one constructed embodiment, nuts 20, 22 are then torqued to between about 24 and about 36 ft-lbs.

A steer axle assembly 10 in accordance with the present invention represents an improvement over conventional steer axle assemblies. Because both of draw keys 16, 18 are disposed on an inboard side of the kingpin 14, better clearance is achieved between the steering knuckle and draw keys 16, 18. For the same reason, a greater portion of the surface of kingpin 14 is able to maintain contact with the full axial length of the cylindrical wall defining bore 46 and the centerline of kingpin 14 is parallel to the centerline of bore 46 thereby eliminating one factor influencing axle camber. Further, the inboard location of draw keys 16, 18 reduces the material and machining requirements associated with boss 28 of beam 12. Finally, locating both of the draw keys 16, 18 on the same side of kingpin 14 and orienting the draw keys 16, 18 in the same manner so that washers 24, 26 and nuts 20, 22 are secured on the same side of beam 12 reduces assembly time as compared to conventional steer axle assemblies.

While the invention has been particularly shown and described with reference to the preferred embodiments thereof, it is well understood by those skilled in the art that various changes and modifications can be made in the invention without departing from the spirit and scope of the invention.

We claim:

1. An axle assembly, comprising:
   an axle beam defining a boss at one end, said boss defining first, second, and third bores, said first bore centered about a first axis and said second and third bores intersecting said first bore on an inboard side of said first axis;
   a kingpin disposed within said first bore, said kingpin centered about a kingpin axis extending parallel to said first axis;
   first and second draw keys disposed within said second and third bores and in engagement with said kingpin; and,
   first and second nuts disposed about said first and second draw keys on one side of said axle beam.

2. The axle assembly of claim 1, further comprising first and second washers disposed about said first and second draw keys on said one side of said axle beam.

3. The axle assembly of claim 2 wherein said washers comprise spring washers.

4. The axle assembly of claim 1 wherein said second bore is disposed about a second axis, said second axis parallel to said first axis.

5. The axle assembly of claim 4 wherein said third bore is disposed about a third axis, said third axis parallel to said plane containing said first axis.

6. The axle assembly of claim 1 wherein said second and third bores extend from said one side of said axle beam through to another side of said axle beam, opposite said one side.

7. The axle assembly of claim 1 wherein said first draw key includes a portion having a plurality of threads.

8. The axle assembly of claim 1 wherein said first draw key includes a portion having a flat, said portion including an induction hardened surface.

9. The axle assembly of claim 1 wherein said one side of said axle beam comprises a rear side of said axle beam.

10. The axle assembly of claim 9, further comprising first and second washers disposed about said first and second draw keys on said one side of said axle beam.

11. An axle assembly, comprising:

an axle beam defining a boss at one end, said boss defining first, second, and third bores, said first bore centered about a first axis and said second and third bores intersecting said first bore on an inboard side of said first axis;

a kingpin disposed within said first bore, said kingpin centered about a kingpin axis extending parallel to said first axis; and, first and second draw keys disposed within said second and third bores and in engagement with said kingpin.

12. The axle assembly of claim 10 wherein said washers comprise spring washers.

13. The axle assembly of claim 11 wherein said second bore is disposed about a second axis, said second axis parallel to a plane containing said first axis.

14. The axle assembly of claim 13 wherein said third bore is disposed about a third axis, said third axis parallel to said plane containing said first axis.

15. The axle assembly of claim 11 wherein said second and third bores extend from said one side of said axle beam through to another side of said axle beam, opposite said one side.

16. The axle assembly of claim 11 wherein said first draw key includes a portion having a plurality of threads.

17. The axle assembly of claim 11 wherein said first draw key includes a portion having a flat, said portion including an induction hardened surface.

* * * * *

UNITED STATES PATENT AND TRADEMARK OFFICE
CERTIFICATE OF CORRECTION

PATENT NO. : 6,579,026 B2
DATED : June 17, 2003
INVENTOR(S) : Moses et al.

It is certified that error appears in the above-identified patent and that said Letters Patent is hereby corrected as shown below:

<u>Column 4,</u>
Line 2, after "parallel to", insert -- a plane containing --

<u>Column 6,</u>
Lines 1-2, after "second and third bores extend from", delete "said"

Signed and Sealed this

Seventh Day of October, 2003

JAMES E. ROGAN
*Director of the United States Patent and Trademark Office*